United States Patent
Schulz et al.

(10) Patent No.: US 9,244,867 B1
(45) Date of Patent: Jan. 26, 2016

(54) MEMORY CONTROLLER INTERFACE WITH ADJUSTABLE PORT WIDTHS

(75) Inventors: Jeffrey Schulz, Milpitas, CA (US); Ching-Chi Chang, San Jose, CA (US); Caroline Ssu-Min Chen, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 211 days.

(21) Appl. No.: 13/151,123

(22) Filed: Jun. 1, 2011

(51) Int. Cl.
G06F 12/00 (2006.01)
G06F 13/14 (2006.01)
G06F 13/00 (2006.01)

(52) U.S. Cl.
CPC ............... *G06F 13/14* (2013.01); *G06F 12/00* (2013.01)

(58) Field of Classification Search
CPC . G06F 11/1423; G06F 12/00; G06F 12/0246; G06F 12/0623; G06F 13/1694; G06F 15/7867; G06F 2212/1016; G06F 9/505; G06F 9/5005; G06F 9/3897; G11C 7/1072; G11C 7/1075; G11C 8/16
USPC .......... 711/171, 105, 103, 154, E12.002, 149, 711/100, E12.001; 710/110, 316, 305, 307; 370/329, 465; 365/230.05
See application file for complete search history.

(56) References Cited

U.S. PATENT DOCUMENTS

| | | | | |
|---|---|---|---|---|
| 5,025,370 | A * | 6/1991 | Koegel et al. | 710/241 |
| 5,657,289 | A | 8/1997 | Hush | |
| 6,226,723 | B1 * | 5/2001 | Gustavson et al. | 711/170 |
| 6,373,779 | B1 * | 4/2002 | Pang et al. | 365/230.05 |
| 6,563,506 | B1 * | 5/2003 | Wang | 345/535 |
| 7,472,236 | B2 * | 12/2008 | Hillier et al. | 711/149 |
| 7,552,267 | B2 * | 6/2009 | Randell et al. | 710/307 |
| 7,664,978 | B2 * | 2/2010 | Burney | G06F 1/10 711/100 |
| 7,908,440 | B2 * | 3/2011 | Kuris et al. | 711/149 |
| 7,913,022 | B1 | 3/2011 | Baxter | |
| 8,200,874 | B1 * | 6/2012 | Wennekamp et al. | 710/243 |
| 8,307,182 | B1 * | 11/2012 | Flateau, Jr. | H03K 19/17736 711/154 |
| 8,380,943 | B2 * | 2/2013 | Shaeffer | G06F 13/1678 711/147 |
| 8,392,661 | B1 * | 3/2013 | Metcalf | 711/133 |
| 2004/0064646 | A1 * | 4/2004 | Emerson et al. | 711/131 |
| 2005/0066135 | A1 * | 3/2005 | Yoshida | G06F 13/1642 711/151 |
| 2006/0041704 | A1 * | 2/2006 | Choi | 710/307 |
| 2007/0033337 | A1 * | 2/2007 | Butt | G11C 7/1051 711/105 |
| 2008/0082751 | A1 * | 4/2008 | Okin et al. | 711/115 |
| 2008/0201548 | A1 * | 8/2008 | Przybylski et al. | 711/171 |
| 2009/0172279 | A1 * | 7/2009 | Yuan et al. | 711/115 |
| 2009/0248999 | A1 * | 10/2009 | Kusachi | 711/158 |

(Continued)

*Primary Examiner* — Yong Choe
*Assistant Examiner* — Edward Waddy, Jr.
(74) *Attorney, Agent, or Firm* — Treyz Law Group; Jason Tsai

(57) ABSTRACT

A programmable integrated circuit may have a memory controller that interfaces between master modules and system memory. The memory controller may receive memory access requests from the masters via ports that have predetermined bit widths. To provide the memory controller with adjustable port widths, a mapping interface may be provided that interfaces between master processing modules and the memory controller. The mapping interface may allocate port resources such as read data ports and write data ports of the memory controller to each master processing module. The mapping interface may assign a desirable number of read data ports and write data ports to each master to accommodate the requirements of that master. The mapping interface may assign a command port to each master that receives memory access requests from that master. The mapping interface may convey write acknowledgements in response to fulfilling write access requests.

21 Claims, 11 Drawing Sheets

(56) References Cited

U.S. PATENT DOCUMENTS

| | | | |
|---|---|---|---|
| 2009/0276556 A1* | 11/2009 | Huang | 710/305 |
| 2010/0005220 A1* | 1/2010 | Loughner | G06F 13/426 711/5 |
| 2010/0211748 A1 | 8/2010 | Perego | |
| 2010/0262790 A1 | 10/2010 | Perego | |
| 2011/0197038 A1* | 8/2011 | Henriksson et al. | 711/158 |
| 2011/0219197 A1* | 9/2011 | Perego et al. | 711/154 |

\* cited by examiner

MEMORY CONTROLLER INTERFACE WITH ADJUSTABLE PORT WIDTHS

BACKGROUND

Programmable integrated circuits are a type of integrated circuit that can be configured by a user to implement custom logic functions. In a typical scenario, a logic designer uses computer-aided design (CAD) tools to design a custom logic circuit. When the design process is complete, the CAD tools generate configuration data. The configuration data is loaded into a programmable integrated circuit to configure the device to perform desired logic functions.

A programmable integrated circuit can be used to communicate with system memory. This type of programmable integrated circuit often includes a memory controller that serves as an interface between the programmable integrated circuit and system memory. The programmable integrated circuit also includes processing modules configured to access system memory by sending memory access requests to the memory controller (e.g., the memory controller includes multiple ports each of which receives memory access requests from a respective module within the programmable integrated circuit).

Conventional memory controllers have fixed attributes. Each port of a conventional memory controller has a predefined port width. The port width of each memory controller port limits the amount of data that can be conveyed between the memory controller and the different processing modules of the programmable integrated circuit. A conventional memory controller has a predefined number of ports. The number of ports limits how many processing modules can interface with system memory. Each port of a conventional memory controller has predefined directions of data flow (i.e., each port allows either uni-directional data transfers or bi-directional data transfers from system memory).

SUMMARY

An integrated circuit such as a programmable integrated circuit may be used to communicate with system memory. The programmable integrated circuit may include reconfigurable circuitry that can be configured to form multiple modules each of which is operable to perform tasks that require access to system memory. The programmable integrated circuit may also include a memory controller that serves as an interface between the different modules and system memory. The various modules may be coupled to the memory controller and may sometimes be referred to herein as "master" processing modules.

The memory controller may receive memory access requests from the master processing modules via respective memory controller ports. The memory controller may be used to fulfill the memory access requests by configuring system memory to respond to the memory access requests (e.g., by performing desired read/write operations). The memory controller may be formed from non-reconfigurable (e.g., non-programmable) logic. Non-reconfigurable logic may sometimes be referred to as "hard" logic. Hard logic may provide improved performance at the expense of reduced flexibility. In particular, a hard memory controller may have predetermined port bit widths, number of ports, and directions of data flow (e.g., port directionality).

To provide a hard memory controller with adjustable port widths, a mapping interface circuit may be provided that serves as an interface between the master processing modules and the hard memory controller. The mapping interface circuit may be configured to allocate available port resources of the memory controller to each master processing module. For example, the mapping interface circuit may assign a desired number of read data ports and/or write data ports to each master to accommodate the requirements of that master. The mapping interface circuit may also assign a corresponding command port to each master. Arranged in this way, the mapping interface circuit enables the hard memory controller to be able to accommodate memory access requests from a variety of master processing modules each of which may require different port bit widths. The mapping interface circuit may provide design flexibility by accommodating bus protocols that require different port widths, number of ports, and directions of data flows.

Further features of the present invention, its nature and various advantages will be more apparent from the accompanying drawings and the following detailed description.

DETAILED DESCRIPTION

Embodiments of the present invention relate to integrated circuits that contain memory controllers. Integrated circuits such as programmable integrated circuits may include reconfigurable circuitry (sometimes referred to herein as "soft" fabric). Users may configure the reconfigurable circuitry to form processing modules such as general purpose processing modules or processing modules that perform specific tasks. Processing modules may perform tasks that require access to system memory (e.g., to store data for later retrieval). Programmable integrated circuits may be provided with "hard" or "soft" memory controllers that serve as interfaces between the processing modules and system memory. "Soft" memory controllers retain flexibility for the user to configure the programmable logic to work with the memory controller, but do so at the sacrifice of performance. Alternatively, the memory controllers used in integrated circuits may be formed from non-reconfigurable logic (sometimes referred to as "hard"

memory controllers). Hard memory controllers typically provide improved performance over memory controllers formed from soft logic, but being formed in non-reconfigurable logic, lose the flexibility provided by "soft" memory controllers.

Each processing module that communicates with the memory controller may sometimes be referred to as a master processing module (or master). The memory controller may have ports coupled to respective master processing modules.

A master processing module may send a memory access request to the memory controller when the master processing module needs to access system memory. For example, a master processing module may send a read access request to the memory controller to retrieve data from memory. The memory controller may receive the read access request and fulfill the read access request by providing control signals to system memory (e.g., the memory controller may receive the read access request and provide control signals to system memory that configure system memory to respond with the requested data). As another example, the master processing module may send a write access request to the memory controller along with corresponding write data to be loaded into system memory. The memory controller may receive the write access request and fulfill the write access request by configuring system memory to overwrite system memory at the specified address.

Memory controllers may receive memory access requests from each master through respective memory ports. Each memory port may have a port width that determines the maximum number of parallel data bits that can be conveyed between a given memory controller port and a corresponding master in a single clock cycle. A port may have a port width of 32 bits, 64 bits, or 128 bits (as examples).

Figure 1:
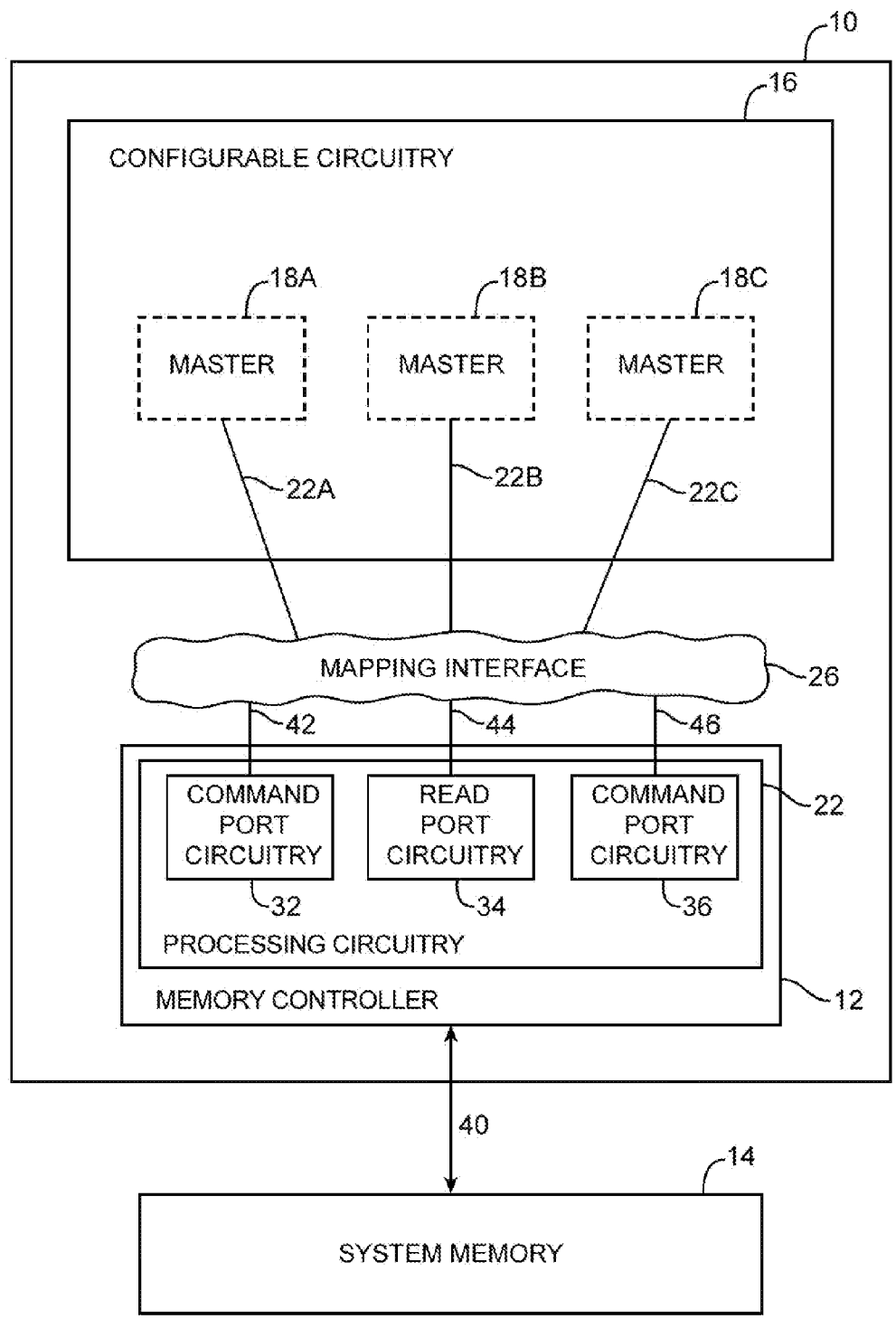
FIG. 1 is a diagram of an illustrative programmable integrated circuit operable to communicate with system memory in accordance with an embodiment of the present invention.

An integrated circuit 10 is shown in FIG. 1 that includes a memory controller 12 and an associated mapping interface 26 (sometimes referred to as a memory controller port mapping circuit) that supports variable memory port widths. Mapping interface 26 may be formed from soft fabric (e.g., reconfigurable logic). Memory controller 12 may serve as an interface between integrated circuit 10 and system memory 14. System memory 14 may be formed from double data rate synchronous dynamic random access memory (e.g., DDR1, DDR2, and DDR3 SDRAM) or other suitable types of memory. Memory controller 12 may be coupled to system memory 14 via path 40.

Device 10 may rely on memory controller 12 to communicate with system memory 14 by providing memory controller 12 with read access requests and write access requests. Memory controller 12 may fulfill the memory access requests by configuring system memory 14 to respond to the memory access requests. For example, device 10 may provide memory controller 12 with a read access request to read a word of data from a desired address within system memory 14. In response to receiving the read request, memory controller 12 may process the request, generate corresponding control signals, and convey the control signals to system memory 14 via path 40. The control signals (e.g., system clock, memory address, and command signals) generated by memory controller 12 may configure system memory 14 to reply with data stored at the desired address.

As another example, device 10 may provide memory controller 12 with a write access request to write a word of data to a desired address in system memory 14. In response to receiving the write request, memory controller 12 may generate and convey control signals (e.g., signals that configure system memory 14 to store the word of data at the desired address) to system memory 14 via path 40.

Programmable integrated circuit 10 may contain configurable circuitry such as configurable circuitry 16. Configurable circuitry 16 may be configured to form multiple processing modules that perform various tasks. For example, a first module 18A may be configured to perform general purpose tasks (e.g., module 18A may be configured as a general purpose processing module) and a second module 18B may be configured to perform other tasks (e.g., module 18B may be configured to perform video decoding tasks). Modules 18 (e.g., 18A, 18B, and 18C) may require access to system memory 14 when performing certain tasks. For example, to complete video decoding tasks, module 18B may read and store data from specified addresses in system memory 14.

Modules 18 (e.g., modules 18A, 18B, and 18C) may be coupled to memory controller 12. Modules 18 that are coupled to memory controller 12 may be referred to herein as master processing modules or simply masters. The example of FIG. 1 having three processing modules is merely illustrative and is not intended to limit the scope of the present invention. Additionally, masters 18 may be formed from reconfigurable logic, such as would be found in a FPGA or other PLD, or may be formed from non-configurable logic, such as would be found in an ASIC. If desired, zero master modules, three or more master modules, ten or more master modules, or other processing circuits that require access to system memory 14 may be formed using configurable circuitry 14.

Many master processing modules (e.g., more than two masters, more than ten masters, more than 100 masters, etc.) that require access to system memory 14 may be coupled to memory controller 12 via mapping interface 26. Each master processing module may be coupled to a respective input port on mapping interface 26. Each input port may have a port width equal to the bit width of memory access requests from a respective master (e.g., the sum of the control bits and data bits that are associated with the memory access requests). Each master processing module may generate memory access requests and convey the memory access requests to memory controller 12. Each memory access request may include control signals that identify information about the memory access request (e.g., the type of memory access request, an address of system memory to read or write, the amount of data to read or write, etc).

Memory controller 12 may include processing circuitry 22 that is coupled to mapping interface 26. Processing circuitry 22 may be formed from non-reconfigurable logic (sometimes referred to herein as "hard" logic). Processing circuitry 22 may contain command port circuitry 32, read port circuitry 34, and write port circuitry 36. Command port circuitry 32 may receive control signals that are associated with memory access requests from mapping interface 26 via path 42. Read port circuitry 34 may transmit read data from system memory 14 to mapping interface 26 via path 44 (e.g., read data from system memory 14 in response to a read access request). Write port circuitry 36 may receive write data from mapping interface 26 via path 46 (e.g., write data associated with a write access request). In response to receiving control signals from mapping interface 26, processing circuitry 22 may process the received control signals and configure system memory 14 to respond to the received control signals.

Processing circuitry 22 may be formed from non-reconfigurable logic (i.e., processing circuitry 22 may be "hardened"). By forming processing circuitry 22 from non-reconfigurable logic, the performance of command port circuitry, read port circuitry, and write port circuitry may be improved while setting the port widths associated with data paths 44, and 46 to fix values (i.e., the port widths of memory controller 12 would be non-reconfigurable).

Figure 2:
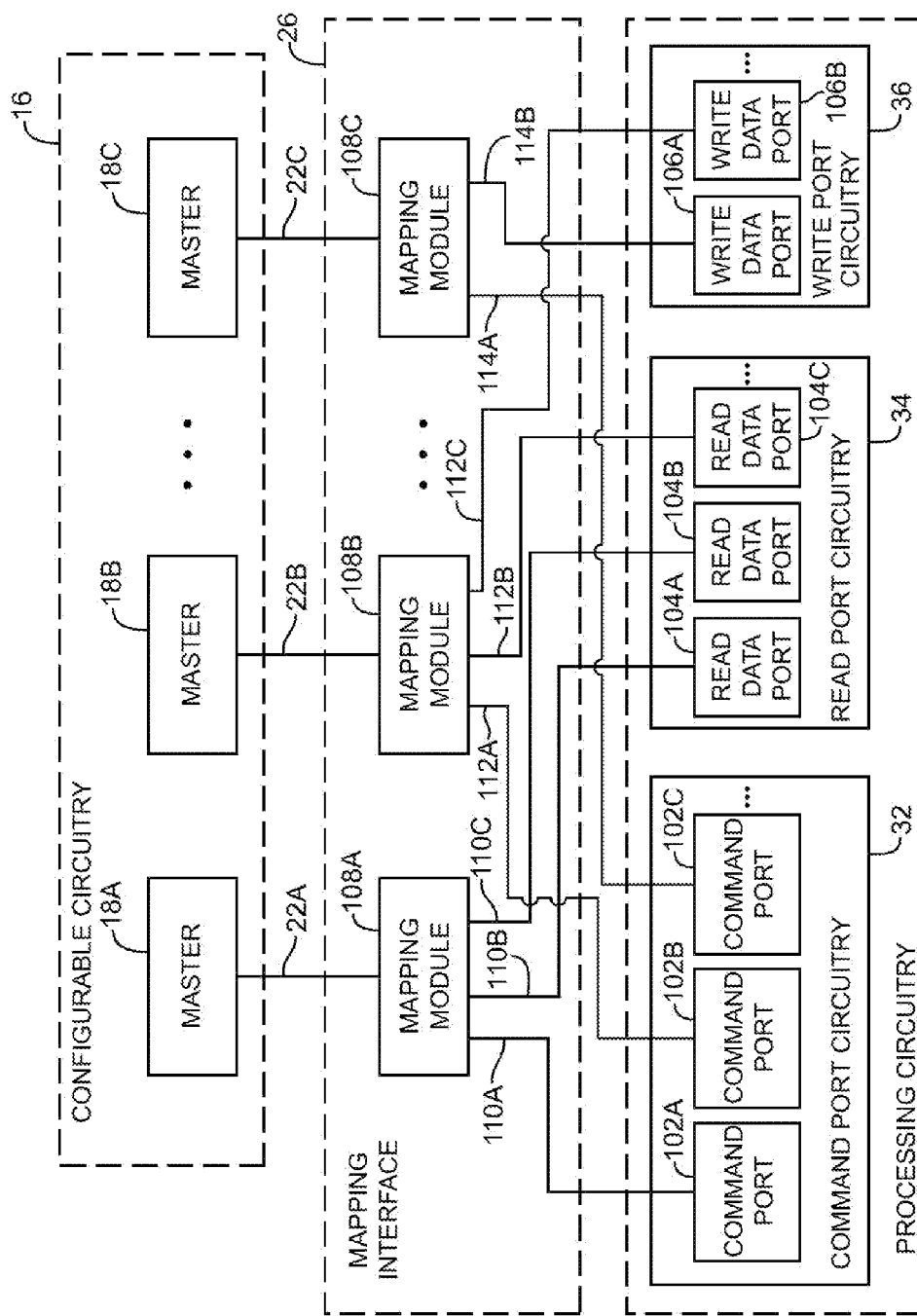
FIG. 2 is a diagram of a mapping interface operable to map memory access requests from master processing circuits to memory controller circuitry in accordance with an embodiment of the present invention.

It may be desirable to provide a memory controller with reconfigurable data port widths. FIG. 2 shows mapping interface 26 interposed between masters 18 (e.g., masters 18A-18C formed from configurable circuitry) and processing circuitry 22 (e.g., processing circuitry formed from non-reconfigurable logic). Mapping interface 26 may be formed from reconfigurable circuitry. Mapping modules 108 (e.g., modules 108A, 108B, and 108C) may be coupled to respective masters 18 (e.g., masters 18A, 18B, and 18C). For example, mapping module 108A may be coupled to master 18A via path 22, mapping module 108B may be coupled to master 18B via path 22B, and master module 108C may be coupled to master 18C via path 22C.

Mapping modules 108 may receive memory access requests from respective masters (e.g., mapping module 108A may receive memory access requests from master 18A via path 22A). Each master 18 may generate memory access requests requiring different bit widths. For example, master 18B may need to write relatively large amounts of data into memory 14, whereas master 18A may need to write relatively small amounts of data into memory 14. In this scenario, master 18B may desire storing relatively large amounts of data per memory transaction (e.g., master 18B may need to store 128 bits of data into system memory 14 per write access request), whereas master 18A may desire storing relatively small amounts of data per memory transaction (e.g., master 18A may only require storing 64 bits of data per write access request).

Mapping modules 108 may be configured by a user to route the control signals and data signals provided by respective masters 18 to appropriate command ports, read data ports, and write data ports. Each data port may have a predetermined bit width. As an example, each read data port may have a bit width of 64 bits (e.g., each read data port may carry 64 bits of read data in parallel from system memory 14 per read access request) and each write data port may have a bit width of 64 bits (e.g., each write data port may convey 64 bits of data in parallel to system memory 14 per write access request).

For example, master 18A coupled to mapping module 108A via path 22A may be configured to read 128 bits of data from system memory 14 per read access request. Each data port may be a 64-bit port (i.e., each data port may be used to read or write 64 bits of data per memory access request). In this scenario, each read request from master 18A may include 128 bits of data to read from system memory. Mapping module 108A may map the first half (i.e., the first 64 bits) of the read data to read data port 104A and the second half (i.e., the last 64 bits) of the read data to read data port 104B.

By partitioning data requests that exceed the data port widths of processing circuitry 22 into smaller portions (i.e., portions having bit widths that are equal to or less than the bit widths of the data ports of processing circuitry), mapping interface 26 may accommodate memory access requests having data bit widths that are larger than the bit widths of the memory controller data ports.

In the example of FIG. 2, master 18A may require a read data bit width of 128 (i.e., master 18A may require 128-bit data transfer for each read access request). Mapping module 108A may receive from master 18A a read access request for 128 bits of read data (i.e., mapping module 108A may receive a read access request from master 18A that requires 128 bits of data from system memory 14) and direct command port 1 to fulfill the 128-bit read access request by retrieving the requested 128 bits of data from memory, partitioning the data into a first 64-bit portion and a second 64-bit portion, and providing the first 64-bit portion at read data port 104A and the second 64-bit portion at read data port 104B. Mapping module 108A may receive the first 64-bit portion via path 110B and the second 64-bit portion via path 110C. Mapping module 108A may combine the first and second 64-bit portions to reconstruct the requested 128-bits of data and provide the reconstructed 128-bits of data to master 18A via path 22A.

To accommodate master processing modules that require both read and write access requests, a memory mapping module may be coupled to both read port circuitry and write port circuitry. As an example, master 18B may provide read access requests that require 64-bit transactions and write access requests that require 64-bit transactions to memory mapping module 108B. To accommodate these memory access requests, mapping module 108B may assign command port 102B, 64-bit read data port 104C and 64-bit write data port 106B to master 18B. As an example, mapping module 108B may receive a read access request from master 18B that requires 64 bits of data from system memory and direct command port 102B to fulfill the read access request by retrieving the requested 64 bits of data from memory and providing the retrieved 64 bits of data at read data port 104C. Mapping module 108B may receive the retrieved 64 bits of data via path 112B and provide the data to master 18B via path 22B.

To conserve system resources (e.g., to conserve the available read data port modules and write data port modules in processing circuitry 22), memory mapping module 108 may provide each master 18 with the minimum amount of port resources required. For example, master 18C may perform tasks that only require write access to memory (i.e., master 18C may not require read access to system memory). In this scenario, mapping module 108C may assign a single 64-bit write data port 106A and a command port 102C to master 18C. Mapping module 108C may receive a write access request from master 18C for loading 128 bits of data into memory (i.e., a write access request to write 128 bits of data provided by master 18C in 64-bit portions). To fulfill this write access request, mapping module 108C may receive a first 64-bit data portion from master 18C, provide the first 64-bit data portion to write data port 106A, and direct command port 102C to store the first 64-bit data portion in system memory 14. After providing the first 64-bit data portion to write data port 106A, mapping module 108C may receive a second 64-bit data portion, provide the second 64-bit data portion to write data port 106A, and direct command port 102C to store the second 64-bit data portion in system memory 14.

By providing configurable port widths, mapping interface 26 may accommodate master processing modules that have various requirements while optimizing system resources (e.g., non-reconfigurable memory port circuitry). FIGS. 3A, 3B, 3C, and 3D illustrate arrangements for using a mapping module to accommodate master processing modules that have different memory port requirements.

Figure 3A:
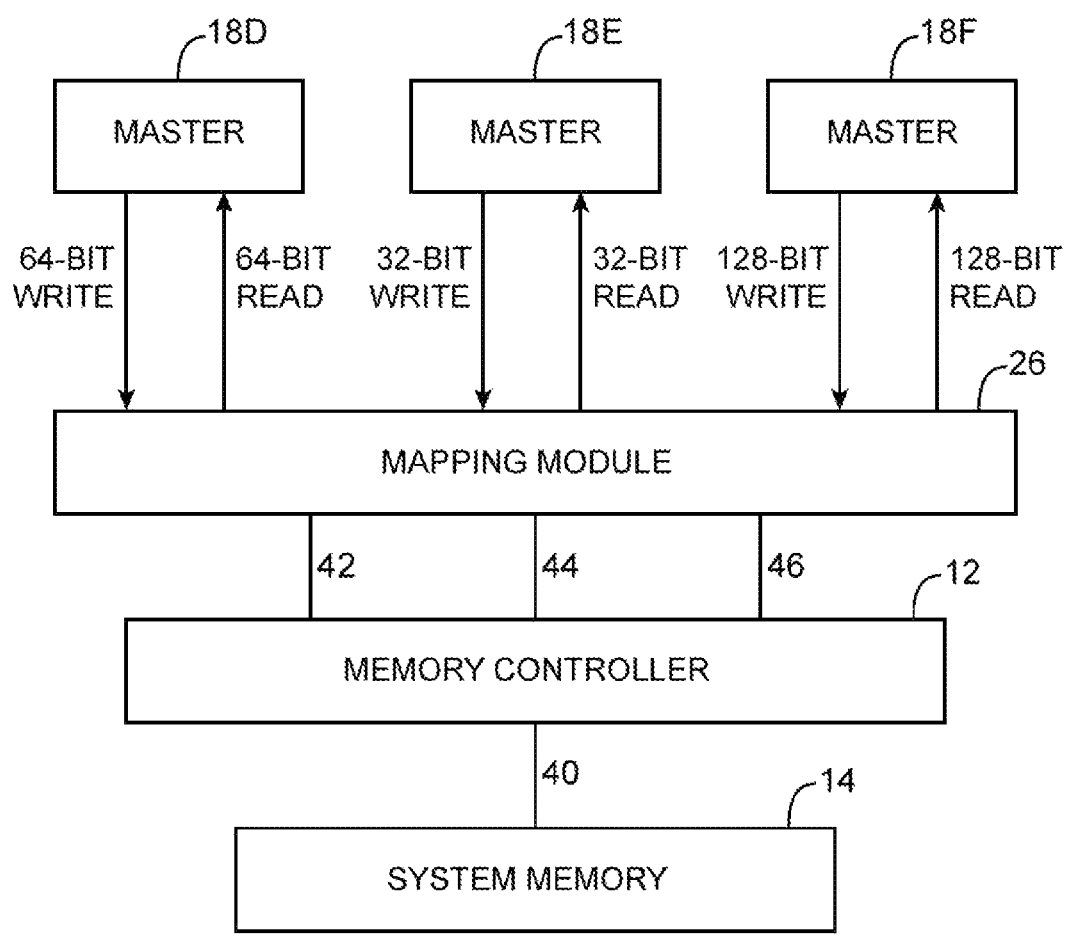
FIGS. 3A-3D are diagrams showing how a programmable integrated circuit may include different numbers of master processing circuits with varying bit width requirements in accordance with an embodiment of the present invention.

As shown in FIG. 3A, mapping interface 26 may be configured to route control and data signals between master processing modules 18D, 18E, and 18F and the ports of memory controller 12. Master processing modules 18D, 18E, and 18F may provide memory access requests to mapping module 26. Mapping interface 26 may be configured to communicate with master 18D via 64-bit read transactions and 64-bit write transactions (i.e., master 18D may provide read access requests that require 64 bits of read data per transaction between master 18D and mapping module 26 and provide write access requests that write 64 bits of write data per transaction between master 18D and mapping module 26). Mapping interface 26 may be configured to communicate with master 18E via 32-bit read transactions and 32-bit write transactions. Mapping interface 26 may be configured to communicate with master 18F via 128-bit read transactions and 128-bit write transactions.

Figure 3B:
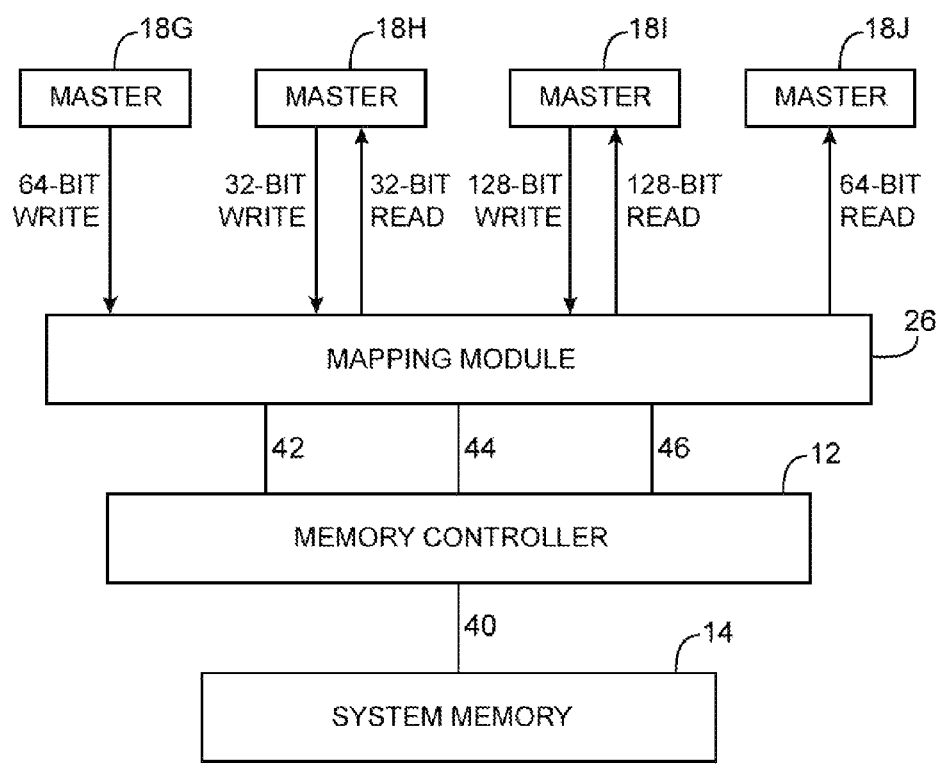

As shown in FIG. 3B, mapping interface 26 may be configured to interface with master processing modules 18G, 18H, 18I, and 18J. Mapping interface 26 may be configured (e.g., by assigning appropriate port resources) to interface with master 18G via 64-bit write transactions. Mapping interface 26 may be configured to interface with master 18H via 32-bit read transactions and 32-bit write transactions. Mapping interface 26 may be configured to interface with master 18I via 128-bit read transactions and 128-bit write transactions. Mapping interface 26 may be configured to interface with master 18J via 64-bit read transactions.

Figure 3C:
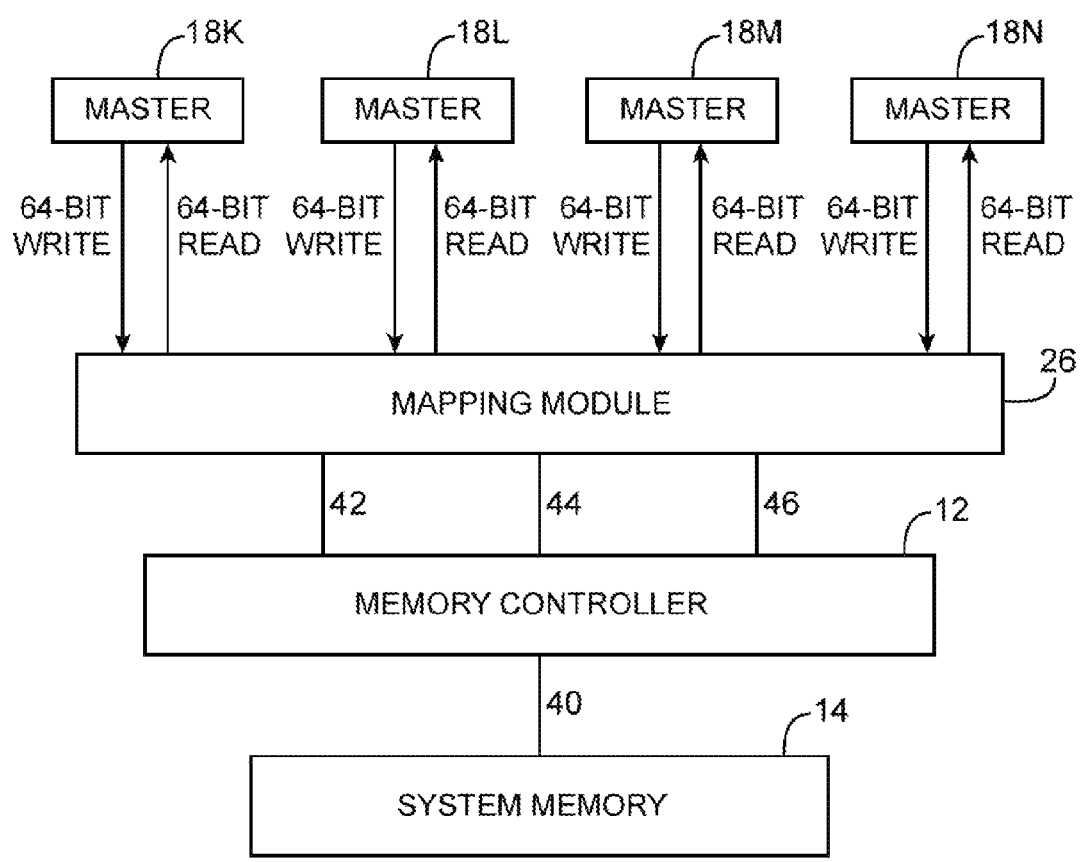

As shown in FIG. 3C, mapping interface 26 may be configured to interface with master processing modules 18K, 18L, 18M, and 18N. Appropriate port resources may be assigned by mapping module 26 to allow each of the master processing modules 18K, 18L, 18M, and 18N of FIG. 3 to access system memory 14 via 64-bit read transactions and 64-bit write transactions.

Figure 3D:
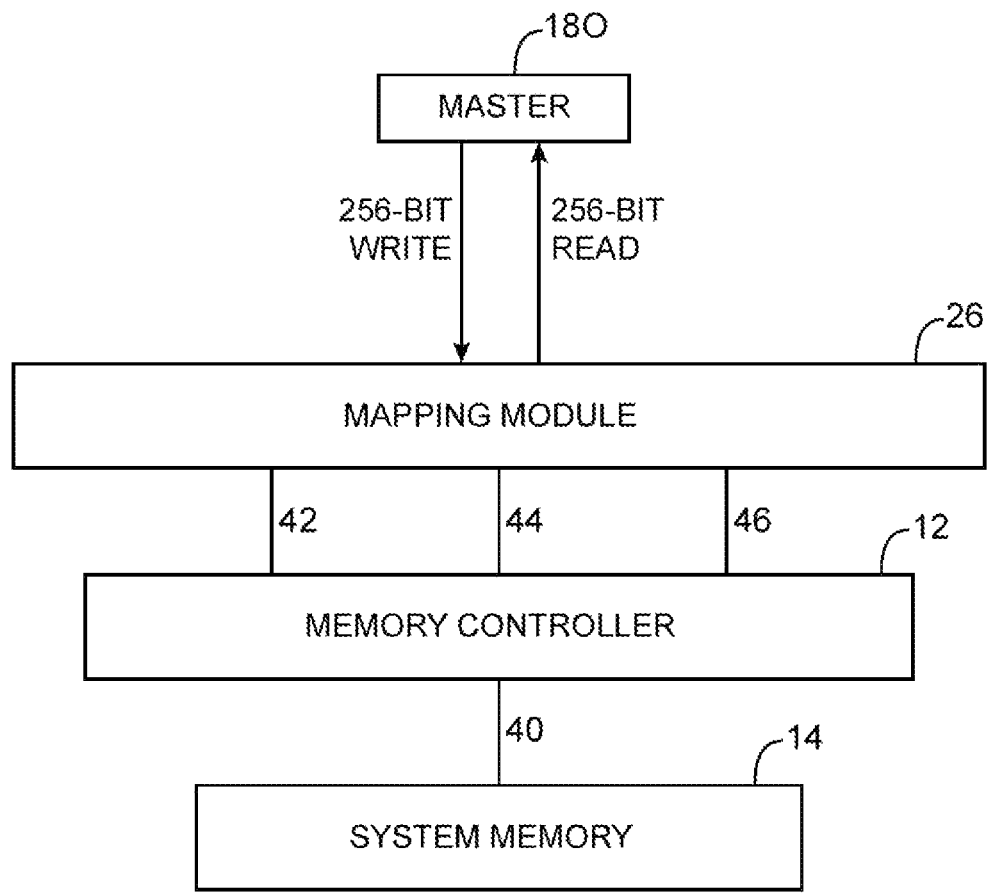

As shown in FIG. 3D, mapping interface 26 may be configured to interface with master processing modules 180. Mapping interface 26 may be configured (e.g., by assigning appropriate port resources) to interface with master 180 via 256-bit write transactions. In this scenario, all of the port resources of memory controller 12 (e.g., all of the read data ports and all of the write data ports of memory controller 12) may be assigned to master 180.

The number of masters and the number of bits per transaction between each master and mapping module 26 is merely illustrative. If desired, any number of master processing modules may be formed to interface with mapping module 26. If desired, the number of bits per transaction between each master and mapping module 26 may be configured to any suitable number within the port resources limitations of a corresponding memory controller (e.g., 32-bits per write transaction, 64-bits per read transaction, 128-bits per read transaction, etc).

Figure 4:
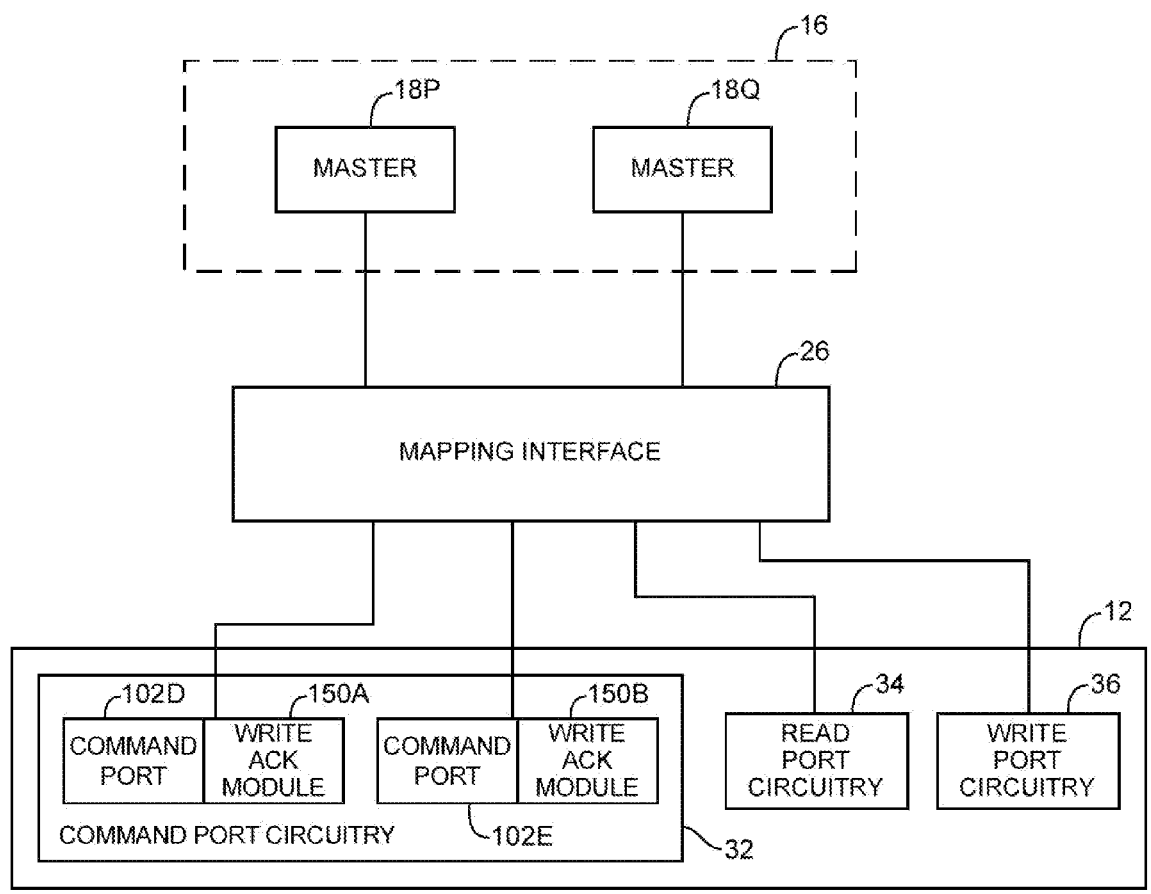
FIG. 4 is a diagram of a memory controller having write acknowledgment modules in accordance with an embodiment of the present invention.

It may be desirable to provide master processing modules with acknowledgement of write access requests. For example, a master processing module may perform tasks that require data to be written to system memory and subsequently read from system memory. To perform these tasks, the master processing module may require verification that the data has been written to system memory before attempting to read the data. FIG. 4 shows an illustrative memory controller 12 that may include write acknowledgement modules 150 (e.g., write acknowledgement module 150A and 150B) that notifies master processing modules of successful processing of write access requests.

As shown in FIG. 4, write acknowledgement module 150 may be associated with command port circuitry. Master 18P may be assigned to command port 102D and associated write acknowledgement module 150A by mapping interface 26. Master 18Q may be assigned to command port 102E and associated write acknowledgement module 150B. Each write acknowledgement module may provide notification to a corresponding master in response to successful processing of write access requests.

For example, master 18G may provide a write access request to mapping interface 26. Mapping interface 26 may forward the write access request to command port 102D and write port circuitry 36. Command port 102D may configure system memory to fulfill the write access request. Write acknowledgement module 150A may notify master processing module 18G of successful processing of the write access request (e.g., write acknowledgement module 150A may notify master processing module 18G that the write access request has been scheduled for fulfillment by system memory).

Figure 5:
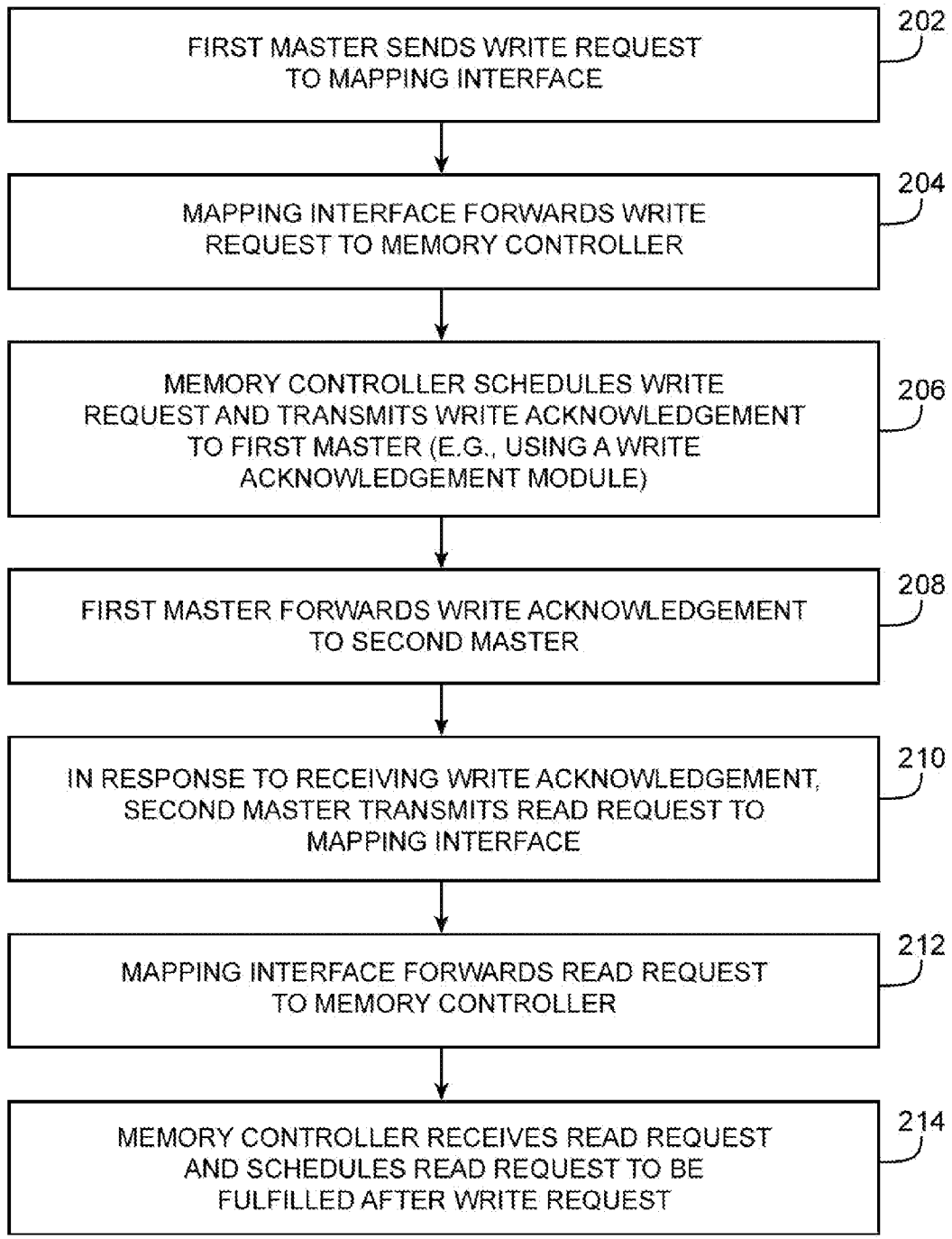
FIG. 5 is a flow chart of illustrative steps involved in operating the programmable integrated circuit of FIG. 1 in accordance with an embodiment of the present invention.

The flowchart of FIG. 5 shows illustrative steps that may be used for using a write acknowledgement module to provide notification of a successful write access request and to guarantee that a subsequent read access request is fulfilled after the write access request.

In step 202, a first master (e.g., master 18P) may send a write access request to mapping interface 26. The write access request may identify an address within system memory at which data is written and may include the data to be written.

In step 204, mapping interface 26 may receive the write access request from the first master (e.g., master 18P) and forward the write access request to appropriate command and data ports of memory controller 12. For example, mapping interface 26 may forward the write access request to command port 102D that is assigned to the first master and forward the write data to write port circuitry 36.

In step 206, memory controller 12 may schedule the write access request to be fulfilled (e.g., by placing the write access request in a scheduling queue) and transmit a write acknowledgement to the first master using write acknowledgement module 150A.

In step 208, the first master may receive the write acknowledgement and forward the write acknowledgement to a second master (e.g., master 18P may forward the write acknowledgement to master 18Q). For example, the second master may wish to read the data written into memory by the first master. The first master may wait for write acknowledgement module 150A to provide a write acknowledgment before indicating to the second master that the data is available in memory. By waiting for the write acknowledgment, the first master may ensure that the second master does not read the data before it is successfully stored in system memory.

In step 210, the second master may receive the write acknowledgement and transmit a read access request to mapping interface 26 in response to receiving the write acknowledgement.

In step 212, mapping interface 26 may forward the read access request to memory controller 12. For example, mapping interface 26 may forward the read access request to command port 102E.

In step 214, memory controller 12 may receive the read access request and schedule the read access request to be fulfilled after the write access request (e.g., the read access request from the second master may be placed into the scheduling queue to be fulfilled after the write access request from the first master.

Figure 6:
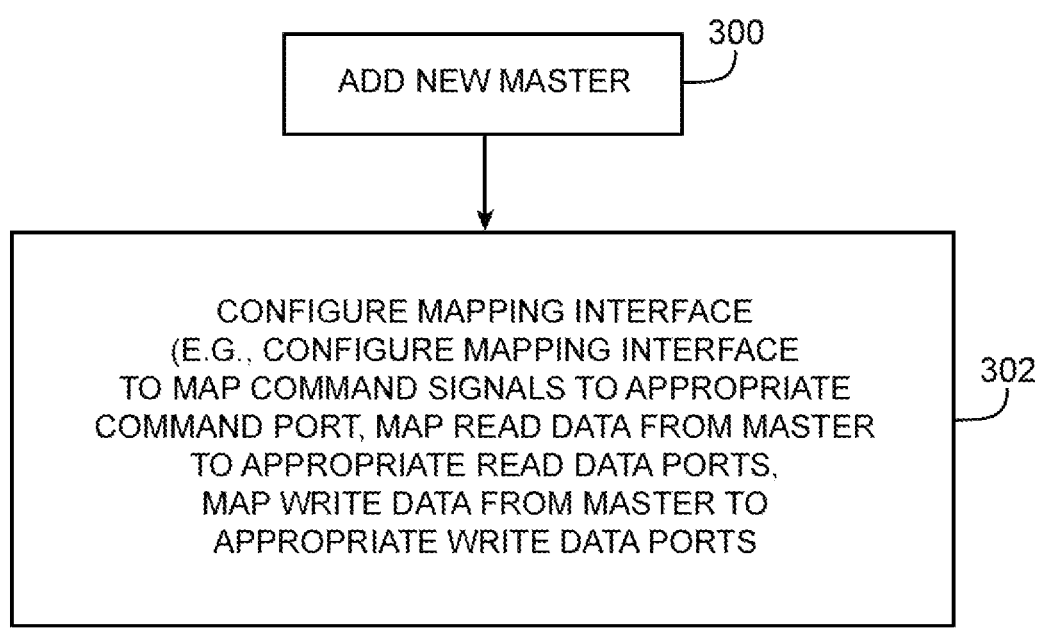
FIG. 6 is a flow chart of illustrative steps involved in operating the memory interface of FIG. 2 in accordance with an embodiment of the present invention.

Master processing modules may access system memory by re-configuring mapping interface 26 during or before normal operation of device 10. The flowchart of FIG. 6 shows illustrative steps that may be performed by a user to configure new master processing modules (i.e., masters) to access system memory via mapping interface 26.

In step 300, a new master may be configured to require access system memory. The new master may be a new master processing module formed from re-configurable circuitry or an existing processing module that has not yet been configured to access system memory.

In step 302, mapping interface 26 may be configured to assign memory port resources of memory controller 12 to satisfy the data port bit width requirements of the new master. For example, mapping interface 26 may assign a command port and a desired combination of read data ports and write data ports to the new master. The combination of read data ports and write data ports may be chosen to conserve memory port resources (e.g., the minimum number of read data ports may be chosen to satisfy the port bit width requirements of the new master).

Memory elements of device 10 may be organized in arrays having numerous rows and columns. For example, memory array circuitry may be formed in hundreds or thousands of rows and columns on a programmable logic device integrated circuit. Programmable integrated circuit 10 of FIG. 7 is an example of an illustrative integrated circuit on which memory array circuitry may be formed.

Figure 7:
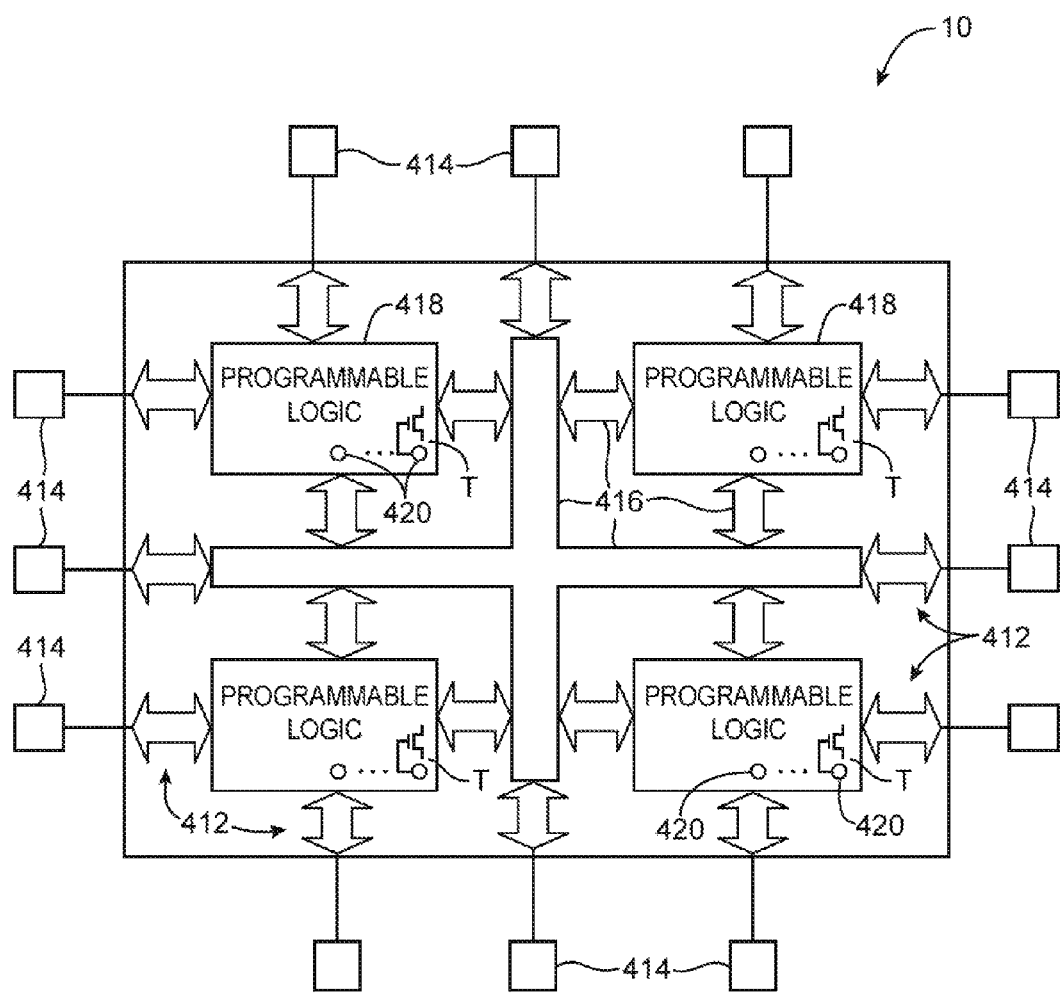
FIG. 7 is a diagram of an illustrative programmable integrated circuit in accordance with an embodiment of the present invention.

As shown in FIG. 7, programmable integrated circuit 10 may have input-output circuitry 412 for driving signals off of device 10 and for receiving signals from other devices via input-output pins 414. Interconnection resources 416 such as global and local vertical and horizontal conductive lines and buses may be used to route signals on device 10. Interconnection resources 416 include fixed interconnects (conductive lines) and programmable interconnects (i.e., programmable connections between respective fixed interconnects). Programmable logic 418 may include combinational and sequential logic circuitry. The programmable logic 18 may be configured to perform a custom logic function.

Programmable integrated circuit 10 contains memory elements 420 that can be loaded with configuration data (also called programming data) using pins 414 and input-output circuitry 412. Once loaded, the memory elements each provide a corresponding static control output signal that controls the state of an associated logic component in programmable logic 418. Typically the memory element output signals are used to control the gates of metal-oxide-semiconductor (MOS) transistors (e.g., transistor T). Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 420 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 420, so CMOS-based memory element implementations are described herein as an example. In the context of programmable integrated circuits, the memory elements store configuration data and are therefore sometimes referred to as configuration random-access memory (CRAM) cells.

Figure 8:
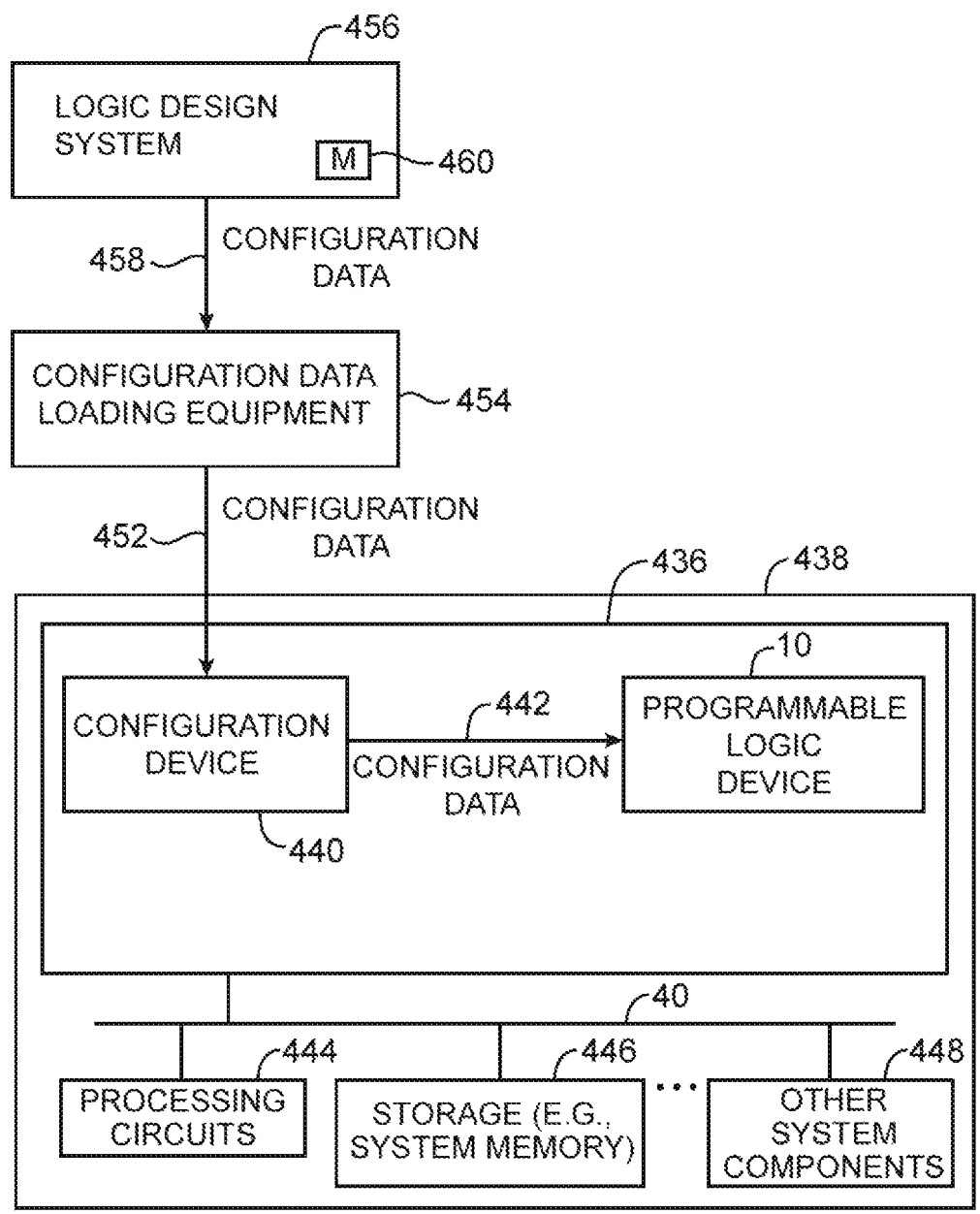
FIG. 8 is a diagram showing how configuration data is created by a logic design system and loaded into a programmable device to configure the device for operation in a system in accordance with an embodiment of the present invention.

An illustrative system environment for device 10 is shown in FIG. 8. Device 10 may be mounted on a board 436 in a system 438. In general, programmable logic device 10 may receive configuration data from programming equipment or from other suitable equipment or device. In the example of FIG. 8, programmable logic device 10 is the type of programmable logic device that receives configuration data from an associated integrated circuit 440. With this type of arrangement, circuit 440 may, if desired, be mounted on the same board 436 as programmable logic device 10. Circuit 440 may be an erasable-programmable read-only memory (EPROM) chip, a programmable logic device configuration data loading chip with built-in memory (sometimes referred to as a configuration device), or other suitable device. When system 438 boots up (or at another suitable time), the configuration data for configuring the programmable logic device may be supplied to the programmable logic device from device 440, as shown schematically by path 442. The configuration data that is supplied to the programmable logic device may be stored in the programmable logic device in its configuration random-access-memory elements 420.

System 438 may include processing circuits 444, storage 446 (e.g., system memory 14), and other system components 448 that communicate with device 10. The components of system 438 may be located on one or more boards such as board 436 or other suitable mounting structures or housings and may be interconnected by buses and other electrical paths 40.

Configuration device 440 may be supplied with the configuration data for device 10 over a path such as path 452. Configuration device 40 may, for example, receive the configuration data from configuration data loading equipment 454 or other suitable equipment that stores this data in configuration device 440. Device 440 may be loaded with data before or after installation on board 436.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 8, the configuration data produced by a logic design system 456 may be provided to equipment 454 over a path such as path 458. The equipment 454 provides the configuration data to device 440, so that device 440 can later provide this configuration data to the programmable logic device 10 over path 442. System 456 may be based on one or more computers and one or more software programs. In general, software and data may be stored on any computer-readable medium (storage) in system 456 and is shown schematically as storage 460 in FIG. 8.

In a typical scenario, logic design system 456 is used by a logic designer to create a custom circuit design (e.g., a circuit design that includes master processing modules that provide memory access requests of various bit widths). The system 456 produces corresponding configuration data which is provided to configuration device 440. Upon power-up, configuration device 440 and data loading circuitry on programmable logic device 10 is used to load the configuration data into CRAM cells 420 of device 10. Device 10 may then be used in normal operation of system 438.

The foregoing is merely illustrative of the principles of this invention and various modifications can be made by those skilled in the art without departing from the scope and spirit of the invention.

What is claimed is:

1. An integrated circuit configured to access memory, comprising:
   circuitry that generates memory access requests;
   a programmable memory interface that receives the memory access requests from the circuitry through a memory interface port having a port width and is configurable to vary the port width used in receiving the memory access requests from the circuitry; and
   a memory controller having a plurality of data ports each of which has an associated port width, wherein the memory controller fulfills the memory access requests by accessing the memory, wherein the programmable memory interface uses a selected number of the data ports in providing the memory access requests to the memory controller, wherein a sum of the port widths of the selected number of data ports is at least equal to the port width of the memory interface port, wherein the programmable memory interface is interposed between the memory controller and the circuitry that generates memory access requests.

2. The integrated circuit defined in claim 1 wherein the memory controller comprises a non-programmable memory controller.

3. The integrated circuit defined in claim 2 wherein the memory access requests comprise read access requests, wherein the data ports comprises a plurality of read data ports, and wherein the programmable memory interface is configured to use the read data ports in fulfilling the read access requests.

4. The integrated circuit defined in claim 3 wherein the memory access requests comprise write access requests, wherein the data ports comprises a plurality of write data ports, and wherein the programmable memory interface is configured to use the write data ports in fulfilling the read access requests.

5. The integrated circuit defined in claim 2 wherein the memory access requests comprise write access requests, wherein the data ports comprises a plurality of write data ports, and wherein the programmable memory interface is configured to use the write data ports in fulfilling the read access requests.

6. The integrated circuit defined in claim 2 wherein the data port widths of the data ports are non-configurable.

7. The integrated circuit defined in claim 2 wherein the memory access requests comprise write access requests, wherein the memory controller is configured to write data into the memory in response to receiving the write access requests and is configured to provide corresponding write acknowledgements to the programmable memory interface, and wherein the programmable memory interface is configured to convey the write acknowledgements to the circuitry.

8. The integrated circuit defined in claim 7 wherein the circuitry comprises programmable logic circuitry.

9. The integrated circuit defined in claim 8 wherein the programmable circuitry includes at least one transistor having a gate and at least one memory element that provides a static control signal to the gate.

10. The integrated circuit defined in claim 1 wherein the memory controller comprises a plurality of command ports each associated with a respective one of the plurality of data ports.

11. An integrated circuit that accesses memory, comprising:
programmable circuitry that generates memory access requests;
a programmable memory interface that receives the memory access requests from the circuitry through a memory interface port having a port width; and
a non-programmable memory controller having a plurality of data ports each of which has an associated port width, wherein the plurality of data ports comprises a plurality of read data ports and a plurality of write data ports, wherein the non-programmable memory controller fulfills the memory access requests by accessing the memory, wherein the programmable memory interface uses a selected number of the data ports in providing the memory access requests to the non-programmable memory controller, wherein a sum of the port widths of the selected number of data ports is at least equal to the port width of the memory interface port, wherein the programmable memory interface is interposed between the programmable circuitry that generates memory access requests and the non-programmable memory controller, and wherein the programmable memory interface selectively maps the programmable circuitry that generates memory access requests to the plurality of data ports of the non-programmable memory controller.

12. The integrated circuit defined in claim 11 wherein the programmable circuitry includes at least one transistor having a gate and at least one memory element that provides a static control signal to the gate.

13. The integrated circuit defined in claim 12 wherein the memory access requests comprise read access requests and wherein the programmable memory interface is configured to use the read data ports in fulfilling the read access requests.

14. The integrated circuit defined in claim 13 wherein the memory access requests comprise write access requests and wherein the programmable memory interface uses the write data ports in fulfilling the write access requests.

15. The integrated circuit defined in claim 12 wherein the data port widths of the data ports are non-configurable.

16. The integrated circuit defined in claim 12 wherein the memory access requests comprise write access requests, wherein the non-programmable memory controller writes data into the memory in response to receiving the write access requests and provides corresponding write acknowledgements to the programmable memory interface, and wherein the programmable memory interface conveys the write acknowledgements to the programmable circuitry.

17. An integrated circuit configured to access memory, comprising:
a first processing circuit that provides a first set of memory access requests, wherein each memory access request of the first set identifies a desired memory address and a memory access request type;
a second processing circuit that provides a second set of memory access requests;
a programmable memory interface that receives the first set of memory access requests through a first memory interface port having a first port width and receives the second set of memory access requests through a second memory interface port having a second port width; and
a non-programmable memory controller having a plurality of data ports each of which has an associated port width, wherein the non-programmable memory controller fulfills the first and second sets of memory access requests by accessing the memory, wherein the programmable memory interface uses a first portion of the data ports to fulfill the first set of memory access requests and uses a second portion of the data ports to fulfill the second set of memory access requests, wherein the programmable memory interface is interposed between the first and second processing circuits and the non-programmable memory controller, and wherein the programmable memory interface selectively maps the first and second processing circuits to the plurality of data ports of the non-programmable memory controller.

18. The integrated circuit defined in claim 17 wherein at least one of the first and second processing circuits comprises a programmable processing circuit.

19. The integrated circuit defined in claim 17 wherein the first set of memory access requests comprise write access requests, wherein the non-programmable memory controller writes data into the memory in response to receiving the write access requests and provides corresponding write acknowledgements to the programmable memory interface, and wherein the programmable memory interface conveys the write acknowledgements to the first processing circuit.

20. The integrated circuit defined in claim 19 wherein the second set of memory access requests comprise read access requests, wherein the first processing circuit conveys the write acknowledgments to the second processing circuit, wherein the read access requests are provided by the second processing circuit in response to receiving the write acknowledgements from the first processing circuit.

21. The integrated circuit defined in claim 20 wherein the programmable memory interface includes at least one transistor having a gate and at least one memory element that provides a static control signal to the gate.

* * * * *